Figure 1:
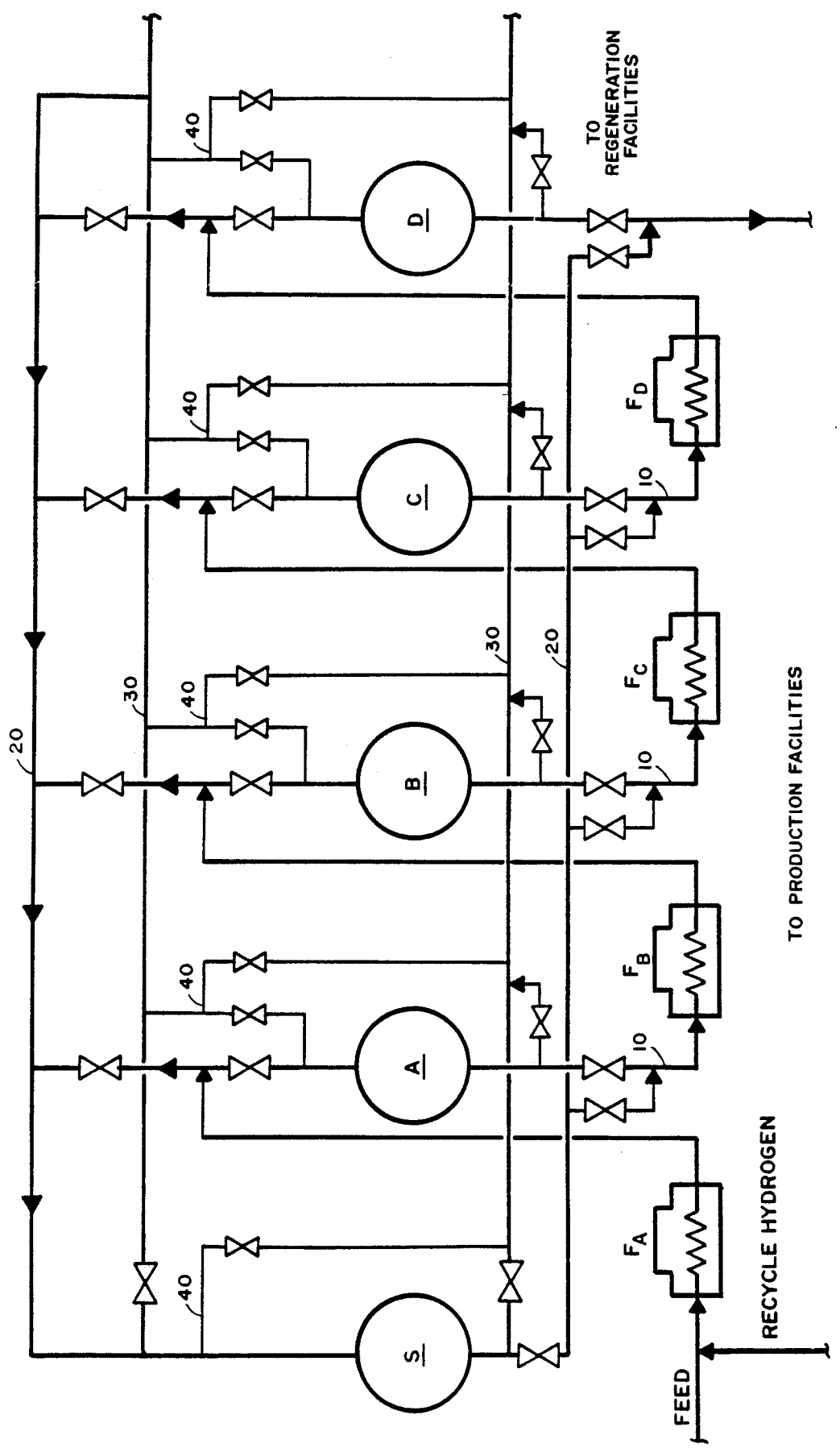

United States Patent [19]

Boyle

[11] Patent Number: 4,769,128
[45] Date of Patent: Sep. 6, 1988

[54] REGENERATION AND REACTIVATION OF REFORMING CATALYSTS AVOIDING IRON SCALE CARRYOVER FROM THE REGENERATOR CIRCUIT TO THE REACTORS

[75] Inventor: Joseph P. Boyle, Sarnia, Canada

[73] Assignee: Exxon Research and Engineering Company, Florham Park, N.J.

[21] Appl. No.: 61,580

[22] Filed: Jun. 15, 1987

[51] Int. Cl.[4] .................... B01J 23/96; C10G 35/085; C10G 35/09
[52] U.S. Cl. ...................................... 208/140; 502/35; 502/37; 502/38; 502/50; 502/516; 502/517
[58] Field of Search ............. 502/50, 516, 517, 35-38; 208/140

[56] References Cited

U.S. PATENT DOCUMENTS

| | | | |
|---|---|---|---|
| 2,884,372 | 4/1959 | Bergstrom | 208/134 |
| 2,980,631 | 4/1961 | Craig et al. | 502/37 |
| 3,137,646 | 6/1964 | Capsuto et al. | 208/65 |
| 3,835,063 | 9/1974 | Davis, Jr. et al. | 252/415 |
| 4,444,895 | 4/1984 | Fung et al. | 502/37 |
| 4,482,637 | 11/1984 | Buss et al. | 502/37 |

Primary Examiner—Paul E. Konopka
Attorney, Agent, or Firm—Roy J. Ott

[57] ABSTRACT

Improvements in a reforming process for the regeneration and reactivation of a bed of a reforming catalyst, notably an iridium-containing catalyst, coked and catalytically deactivated during the on-oil portion of a reforming cycle. The reactor containing the catalyst is contained in a multi-reactor unit, the individual reactors of which are connected in series via suitable piping and valving. The reactor can be alternately manifolded with production facilities during the on-oil portion of the operating cycle during which period the catalyst of said reactor becomes coked, and can be manifolded alone or with other reactors with a ferrous metal regeneration circuit during the catalyst regeneration and reactivation portion of an operating cycle during which period the catalyst is regenerated and reactivated. In the regeneration and reactivation of the coked catalyst the sequence of process steps include (a) an oxidation step and subsequent reduction step, or (b) a reduction step and subsequent oxidation step, to remove coke and redisperse the iridium component of the catalyst of said reactor. Iron scale carryover from the regeneration circuit to the catalyst of said reactor is drastically reduced by by-passing said reactor during the periods of transition from the (a) oxidation step to the reduction step, or (b) from the reduction step to the oxidation step by closing off the manifold connection between the regeneration circuit and the said reactor. Loss of catalyst activity due to iron scale carryover to the catalyst of said reactor is thus suppressed.

11 Claims, 2 Drawing Sheets

REGENERATION AND REACTIVATION OF REFORMING CATALYSTS AVOIDING IRON SCALE CARRYOVER FROM THE REGENERATOR CIRCUIT TO THE REACTORS

FIELD OF THE INVENTION

This invention relates to improvements in a process for the regeneration and reactivation of deactivated catalysts. In particular, it relates to the regeneration and reactivation of coked iridium-containing reforming catalysts, especially iridium promoted platinum reforming catalysts.

BACKGROUND

Catalytic reforming, or hydroforming, is a process in wide use by the petroleum industry for upgrading naphthas and straight run gasolines to improve the octane quality of the product. This process is generally carried out in a multi-reactor system, usually containing three or four ferrous metal reactors in series. Each reactor is provided with a ferrous metal preheater through which the feed and hydrogen are passed during the on-oil portion of an operating cycle prior to introduction into a reactor. Each reactor is also provided with one or more beds of reforming catalyst, the feed and hydrogen being introduced generally downflow into a reactor, flowing through the catalyst beds and in sequence from one reactor to the next of the series. During the on-oil portion of an operating cycle coke deposits on the catalyst; the coke deposition resulting in a decrease in the number of catalytically active sites, with a concurrent loss of catalyst activity. Consequently, as coke builds up on the catalyst surface the temperature of a given reactor is gradually increased to offset the loss of catalyst activity caused by coke build up. Inevitably it is required that the coked catalyst be taken off oil, regenerated by burning the coke from the catalyst, and the catalyst reactivated by redispersing the agglomerated metallic hydrogenation-dehydrogenation component, e.g., platinum, or platinum and iridium. On-oil reforming, as relates to the use of a given reactor, can then be resumed.

The multi reactor system through the use of ferrous metal manifolds, pipes and valving is associated on the one hand with production facilities for on-oil use and, on the other hand, with regeneration facilities for use in regeneration and reactivation of the catalyst. When the catalyst of a reactor, or reactors, must be regenerated and reactivated the reactor must be taken off-oil and connected to the regeneration facilities. In a semi-regenerative type reforming operation, to regenerate and reactivate the coked catalyst, the entire multi reactor system is shut down for regeneration and reactivation of the catalyst. The catalyst in the several reactors is then regenerated and reactivated and the unit as a whole is then returned to on-oil production. In a cyclic reforming operation, the reactors of the multi reactor system are individually swung out of line by the piping and valving arrangement used, and the catalyst regenerated and reactivated while the other reactors are maintained on-oil. A "swing reactor" temporarily replaces a reactor which is removed from the series for regeneration and reactivation of the catalyst, after which time it is put back in series. On-oil production is continuous, and the catalyst can be regenerated and reactivated without interference with production.

The earlier platinum catalysts were readily regenerated by burning the coke off the catalyst at controlled conditions in an atmosphere of oxygen, or oxygen and chlorine, at contolled flame front temperature, and the agglomerated platinum component then redispersed with relative ease by contact at elevated temperature with chlorine, generally in admixture with oxygen, to increase the rate of dispersion. However, this is not the case with the more modern iridium-containing, or iridium promoted platinum catalysts. In an oxygen atmosphere at elevated temperature the iridium component of an iridium-containing catalyst is severely agglomerated and the catalyst readily damaged. Nonetheless techniques have been developed by virtue of which iridium, or iridium in admixture with platinum, or platinum and other metal components can be redispersed to the required high surface area state.

Regeneration and reactivation of iridium-containing catalysts typically requires one or more cycles of a sequence of steps which include (i) oxidation of the catalyst in an oxidizing atmosphere in a controlled burn off of the carbon from the coked catalyst, (ii) reduction of the oxidized metallic components of the catalysts in a hydrogen atmosphere, and (iii) treatment of the catalyst by contact of same with halogen, an admixture of halogen and oxygen, or an admixture of halogen halide and oxygen, to redisperse the agglomerated iridium component or iridium-containing metallic components. Regeneration and reactivation of the catalyst results in the formation of a large amount of iron scale within the regeneration circuit of the reactor system, and the transfer of iron from the interior of the vessels and piping of the regeneration circuit onto the surface of the catalyst of the reactor. The iron scale reacts with the catalyst and suppresses the activity of the freshly activated catalyst. The migration of scale from the regeneration circuit to the beds of catalyst within the reactor is particularly troublesome at the side of the bed first contacted by the gases from the regeneration circuit, e.g., at the top of the beds in a downflow reactor. Catalyst activity depression at this location can thus be particularly severe, the scale becoming chemically bound to the surface of the catalyst.

Exclusion of the iron scale from contact with the catalyst has been achieved by a number of prior art techniques. These include dumping the catalyst from the reactor, screening off the most contaminated portion of the catalyst, and returning the uncontaminated or less contaminated catalyst to the reactor. This quite obviously is time consuming, and not only costly as a result of the lost time, but expensive due to loss of catalyst, and lost production. The installation of an on-stream filter in advance of the reactor has also been tried, but this has resulted in significant capital expenditures, as well as increased production costs due to the pressure drop within the regeneration circuit.

Current procedures required for the regeneration and reactivation of iridium-containing catalysts thus result in the formation and transfer of iron scale from the regeneration circuit to the reactors. Reactor scale migrates to the catalyst becoming chemically bound thereto to cause decreased catalyst activity. Present methods are inadequate to deal with this problem, as a result of which the catalyst suffers loss in catalyst activity despite the fact that the basic purpose of the regeneration and reactivation procedure which is employed is to restore the activity of the catalyst prior to its return to on-oil service.

OBJECTS

It is accordingly the primary objective of the present invention to provide a new and improved process which will overcome these and other disadvantages by suppressing, or preventing iron scale carryover from a regeneration circuit to a reactor, or reactors, such as occurs in the regeneration and reactivation of coked reforming catalysts in the application of sequential oxidation and reduction steps, particularly as required in the regeneration and reactivation of coked iridium-containing catalysts.

More particularly, it is an object to provide a process which not only will suppress iron scale carryover to the reforming catalysts, especially iridium-containing catalysts, but at the same time will achieve essentially complete regeneration and removal of the carbon from the coked catalyst.

A further and yet more specific object is to provide a process providing means for excluding contact between a major amount of the iron scale that is formed and the catalyst, notably an iridium-containing catalyst.

THE INVENTION

These objects and others are achieved in accordance with this invention embodying a process providing means which suppresses, or excludes in major amount, the carryover of iron scale from the regeneration circuit of a reforming unit to a reactor, or reactors, thus avoiding contact of the iron scale with the catalyst. This is accomplished by by-passing the reactor, or reactors, to discharges from the regeneration circuit during transitions from an oxidizing environment to a reducing environment, or from a reducing environment to an oxidizing environment, during which periods the transfer of iron scale from the regeneration circuit to the reactor, or reactors, of a unit is particularly severe.

Conventional procedures for the regeneration and reactivation of reforming catalysts, particularly iridium-containing catalysts, are known to result in a significant transfer of iron scale from the regenerator circuit to the reactor, or reactors, the catalyst of which is being regenerated and reactivated. Recent study, observations, and tests have shown however that the amount of iron scale transferred from the regenerator circuit to the reactor, or reactors, can be very small during some portions of the catalyst regeneration and reactivation cycle, and quite large during certain other portions of the catalyst regeneration and reactivation cycle. Thus, e,g., it has been discovered that the transfer of iron scale from the regenerator circuit to the reactors is very small during a primary burn, which is defined as the first portion of a catalyst regeneration and reactivation cycle as when coke is burned from an iridium-containing catalyst in an environment containing small amounts of oxygen at flame front temperatures not in excess of about 425° C. During the initial portion of the primary burn the amount of iron scale transferred from the regenerator circuit to the reactors was found to be almost insignificant, though the amount of scale transferred was found to gradually increase throughout the primary burn period. Where the catalyst regeneration and reactivation cycle requires both an oxidizing environment and a reducing environment, as in the majority of regeneration and reactivation processes in use today, the amount of scale transferred from the regeneration circuit to the reactor, or reactors, during the oxidation environment and reducing environment, respectively, can range from quite low to relatively low, or even to moderate. However, it has been observed that the transfer of iron scale from the regeneration circuit to a reactor, or reactors, is quite severe, particularly in the regeneration and reactivation of iridium-containing catalysts, during the periods of transition from an oxidizing environment to a reducing environment, and from a reducing environment to an oxidizing environment; albeit, as suggested, at other times very little carry-over of scale from the regenerator system to the reactors may occur. Consequently, it has been learned that the transfer of iron scale from the regeneration circuit to a reactor, or reactors, can be drastically reduced by by-passing the reactors during oxidation to reduction and reduction to oxidation transition periods within the regenerator circuit.

These features and others will be better understood by reference to the following more detailed description of the invention, and to the drawing to which reference is made.

REFERENCE TO THE DRAWING

Figure 2:
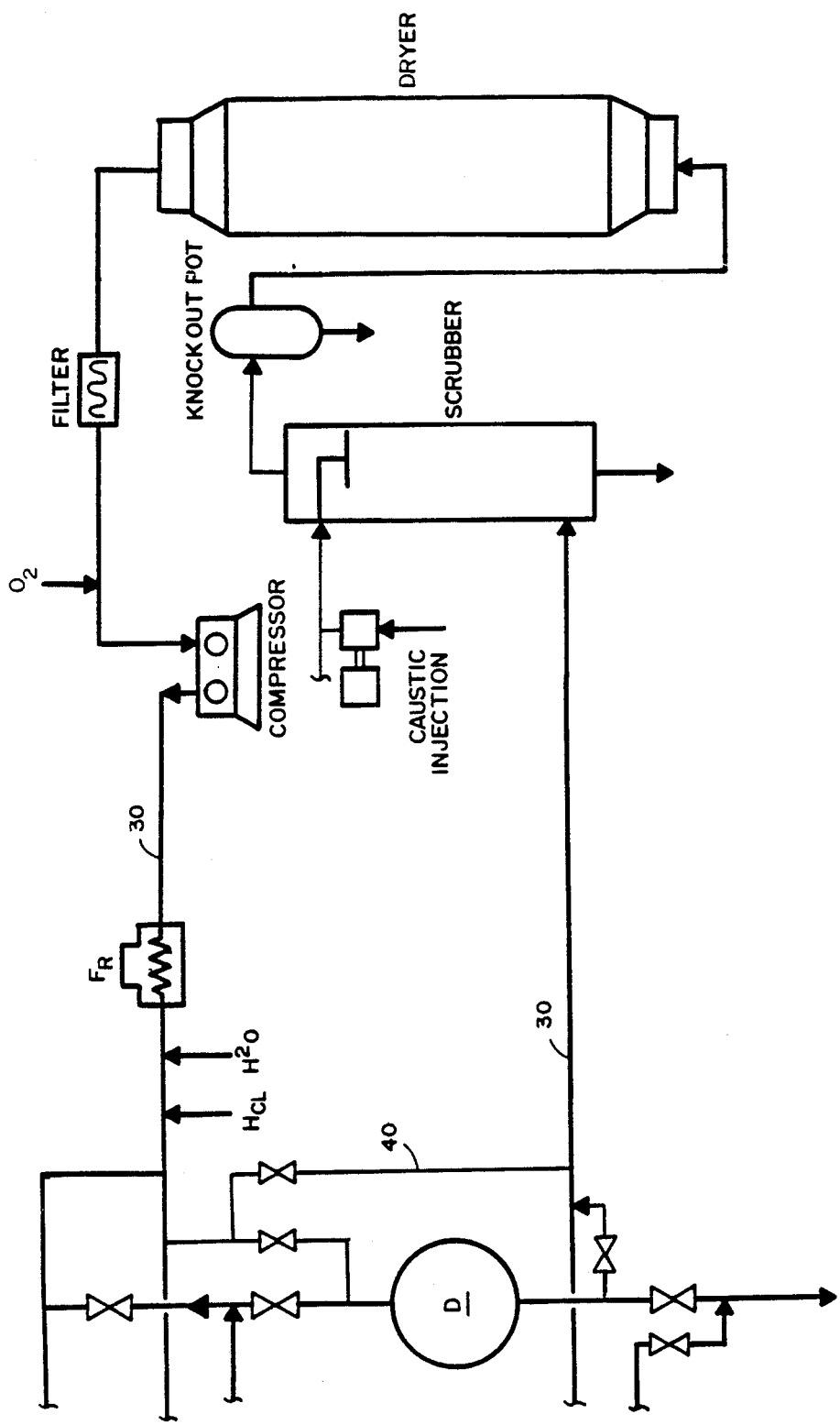

In the drawing:

FIG. 1 depicts, by means of a simplified flow diagram, a cyclic reforming unit inclusive of multiple on-stream reactors, an alternate or swing reactor inclusive of manifolds and reactor by passes for use with catalyst regeneration and reactivation equipment; and FIG. 2 depicts in schematic fashion catalyst regeneration and reactivation facilities, and the manner in which the coked deactivated catalyst of a given reactor of a cyclic unit can be regenerated and reactivated, as practiced in accordance with the present invention.

Referring to the FIG. 1, generally, there is described a cyclic unit comprised of a multi-reactor system, inclusive of on-stream Reactors A, B, C, D and a swing Reactor S, and a manifold useful with a facility for periodic regeneration and reactivation of the catalyst of any given reactor. Swing Reactor S is manifolded to Reactors A, B, C, D so that it can serve as a substitute reactor for purposes of regeneration and reactivation of the catalyst of a reactor taken off-stream. The several reactors of the series A, B, C, D, are arranged so that while one reactor is off-stream for regeneration and reactivation of the catalyst, it can be replaced by the swing Reactor S; and provision is also made for regeneration and reactivation of the catalyst of the swing reactor.

The on-stream Reactors A, B, C, D are each provided with a separate furnace or heater $F_A$, or reheater $F_B$, $F_C$, $F_D$, respectively, and all are connected in series via an arrangement of connecting process piping and valves, designated by the numeral 10, so that feed can be passed in seratim through $F_A A$, $F_B B$, $F_C C$, $F_D D$, respectively; or generally similar grouping wherein any of Reactors A, B, C, D are replaced by Reactor S. Any one of the on-stream Reactors A, B, C. D, respectively, can be substituted by swing Reactor S as when the catalyst of any one of the former requires regeneration and reactivation. This is accomplished by "paralleling" the swing reactor with the reactor to be removed from the circuit for regeneration by opening the valves on each side of a given reactor which connect to the upper and lower lines of swing header 20, and then closing off the valves in line 10 on both sides of said reactor so that fluid enters and exits from said swing Reactor S. Regeneration facilities, not shown, are manifolded to each of the several Reactors A, B, C, D, S through a parallel circuit of connecting piping and valves which form the upper and lower lines of regeneration header 30, and any one of the several reactors can be individually isolated from the other reactors of the unit and the catalyst thereof regenerated and reactivated.

FIG. 2 depicts generally a catalyst regeneration and reactivation circuit, or regenerator circuit, as used in this instance for the regeneration and reactivation of the coked deactivated catalyst of a reactor, e.g., the catalyst of Reactor D, which has been taken off line and replaced by Swing Reactor S. The catalyst regeneration and reactivation circuit includes generally a scrubber, knock out pot, drier, and regenerator furnace $F_R$, all serially connected through a filter and compressor with the furnace $F_D$ and Reactor D which has been taken off line for regeneration and reactivation of the coked deactivated catalyst. The so formed circuit also includes location for injection of water, oxygen, and hydrochloric acid, as shown.

In the regeneration of a coked deactivated catalyst oxygen is injected after passage through regenerator furnace $F_R$ via the furnace $F_D$ into the Reactor D. In reactivation of the coked depleted catalyst oxygen and hydrochloric acid, and water if needed, are injected into the Reactor D to redisperse the agglomerated catalytic metal, or metals, components of the catalyst. The HCl and water are added downstream of the regenerator furnace $F_R$. Acid gas from the reactor is passed through the scrubber to which caustic is injected, and off gas from the scrubber is introduced into the knock out pot from the bottom of which a liquid is removed. The scrubbed gas output from the knock out pot is passed through the drier to remove vaporous moisture, and then filtered by passage through the filter. The cleaned, dried gas is again ready for recycle through the reactor circuit, on addition of the required components.

In accordance with the practice of this invention, during transitions from an oxidizing environment to a reducing environment, or from a reducing environment to an oxidizing environment, the by-pass line 40 around Reactor D is opened, and the flow path through Reactor D is closed to avoid the carry over of iron scale from the regenerator circuit to the catalyst of Reactor D. At other periods, the by-pass line 40 is closed and the flow path through Reactor D is open.

An isolated reactor which contains a bed of catalyst, the latter having reached an objectionable degree of deactivation during the on-oil portion of an operating cycle due to coke deposition thereon, is first purged of hydrocarbon vapors with a nonreactive or inert gas, e.g., helium, nitrogen, or flue gas. The coke or carbonaceous deposits is then burned from the catalyst by contact with a gas of low oxygen content at controlled temperature, generally below about 425° C. in a primary burn. The temperature of the burn is controlled by controlling the oxygen concentration and inlet gas temperature, this taking into consideration the amount of coke to be burned and the time required in order to complete the burn. Typically, the catalyst is treated with a gas having an oxygen partial pressure of less than about 7 KPa, and preferably in the range of about 0.3 KPa to about 3.5 KPa to provide the desired flame front temperature for a time sufficient to remove the coke deposits. Coke burn-off can be accomplished by first introducing only enough oxygen to initiate the burn while maintaining a relatively low temperature and gradually increasing the temperature as the flame front is advanced by additional oxygen injection until the temperature has reached optimum. Most of the coke can be readily removed in this way. Generally, from about 72 hours to about 120 hours are required to complete the primary burn.

Typically in reactivating decoked iridium-containing catalysts, following coke burn-off in an oxidizing atmosphere, one or more cycles of sequential hydrogen reduction and halogenation treatments are required to reactivate the reforming catalysts to their original state of activity, or activity approximating or approaching that of a fresh catalyst. During coke burn-off the iridium component of the catalyst, or iridium and other hydrogenation components of the catalyst, is generally agglomerated and the iridium component oxidized. Consequently, following removal of the coke or carbonaceous deposits from the catalyst, the catalyst is treated in a reducing atmosphere, generally by contact with hydrogen, to reduce the metal oxides and oxide layers present in the agglomerated metallic iridium particles formed during coke burn off, and to aid in removing residual active carbon deposits yet contained on the catalyst.

Prior to initiation of the reduction step, and on completion of the primary burn, the reactor the catalyst of which is being regenerated and reactivated, the by pass line around the reactor is opened and the line through the reactor is closed. Thus, gases flowing from the regeneration circuit are by passed around the reactor and returned to the regeneration circuit and this is continued for the period that the passage of iron scale from the regeneration is particularly high, and discontinued only when the passage of iron scale has been drastically reduced. Generally, the reactor is by passed for a period ranging up to about 8 hours after initiation of the reduction step, more typically for a period ranging up to about 6 hours. In general, the reactor is by passed for a period ranging from about 4 to about 8 hours, most often for a period ranging from about 4 to about 6 hours. After the passage of iron scale from the regenerator circuit to the reactor circuit the by pass line is closed, and the line through the reactor is opened. The reduction is generally carried out by contacting the catalyst with hydrogen or a hydrogen-containing gas at elevated temperature, generally the range of about 250° C. to about 600° C., preferably from about 300° C. to about 540° C., and more preferably from about 400° C. to about 450° C. The reduction is continued for a time sufficient to substantially reduce the metal oxides present to the free metal, or metals, as evidenced e.g., by the absence of metal oxide lines and the appearance of or increase in iridium metal lines in the X-ray diffraction pattern. Preferably in conducting the reducing step, hydrogen is employed in concentration of from about 0.05 to about 5 volume percent, and pressures of from about 0.1 to about 2.0 MPa. The hydrogen treat gas generally contains a non-reactive or inert gas component such as nitrogen. Preferably, the reduction is carried out at temperature and time sufficient to produce substantial reduction of the iridium oxides, or iridium oxides and other metal oxides to the free metals. Generally, at least about 75 percent of the iridium oxides present is reduced, and preferably from about 75 percent to about 100 percent, and more preferably from about 90 percent to about 100 percent. Generally, the time required for the reduction will range from about one to about 6 hours, depending on the process conditions.

On completion of the reduction step, the decoked-reduced catalyst is then halogenated to passivate the catalyst by raising its chloride level for protection of the catalyst during the subsequent metal, or metals, redispersion step. The decoked-reduced catalyst is thus contacted, and pretreated with a halide-providing compound or compound containing ionically or covalently bound halogen which, under process conditions, will release the halogen in halide form, preferably as a hydrogen halide, for contact with the catalyst surface. Haloorgano compounds and hydrogen halides are exemplary of halide-providing compounds. Haloorgano compounds include various halocarbons, e.g., chlorocarbons such as carbon tetrachloride, methylene chloride, chloroform, methyl chloride, 1,2-dichloroethane, hexachloroethane, mixtures of these and other compounds and the like. When using haloorgano compounds, hydrogen is added to the gaseous mixture to convert the haloorgano compound to a hydrogen halide.

Halogen halides are preferred, whether added directly or generated in situ. Exemplary of hydrogen halides are hydrogen fluoride, hydrogen chloride, hydrogen bromide, and the like. Hydrogen chloride is preferred. The atmosphere in contact with the catalyst during this step can contain other non-reactive or inert gases, e.g., nitrogen and the like, and including water vapor which can produce more uniform distribution of halide on the catalyst surface prior to the halogenation treatment. The presence of hydrogen gas or other reducing gas is also beneficial, hydrogen generally being added in an amount of about 1 to about 2 volume percent to insure that the reduced catalyst remains in the reduced state during the hydrogen halide pretreatment. The atmosphere is maintained substantially elemental oxygen-free during the halide pretreatment to suppress reaction between elemental halogen and surface hydroxyl groups which can generate elemental oxygen.

The halogenation treatment is generally conducted at temperature in the range of from about 250° C. to about 600° C., preferably from about 300° C. to about 540° C. The halide-providing compound, at these temperatures is contacted with the catalyst in a gaseous stream until at least about 1 weight percent or above (dry, coke-free basis), preferably about 1.3 weight percent halide or above, is provided upon the catalyst as detected, for example, by X-ray fluorescence. More preferably, the catalyst is pretreated to contain within a range of from about 1.4 to about 2.5 weight percent halide, or higher, most preferably up to saturation by halide of the catalyst surface under the process conditions. Some catalysts require greater amounts of halogen than others for promoting metals redispersion. If a "purge" of hydrogen, nitrogen, water, mixtures thereof, or other materials is used subsequent to the halide pretreatment in the treatment of a catalyst, then such purge or contacting should not reduce the halide level to below about 1 weight percent. If this happens, then the halide pretreatment should again be conducted to insure about 1 weight percent halide or above, being present. This is particularly true in cases where multi-cycle treatment of reduction and halide redispersion steps are necessary in which event the weight percent of halide present on the catalyst must be replenished again to about 1 weight percent or above, prior to each hydrogen halide/oxygen redispersion treatment.

In the preferred practice of this invention, in conducting the halide pretreatment, a fast flowing stream of hydrogen chloride is contacted with the catalyst up to, and slightly beyond breakthrough, i.e., the first visible detection at the gas exit side of the catalyst bed by an analytical method e.g., the color change of an acid-base indicator, such as phenolphthalein. Halide pretreatment to breakthrough can readily provide the desired halide loading of the catalyst as well as insure a uniform distribution of halide over the entire length of the catalyst bed, avoiding "halide gradients" which can lead to non-uniform redispersion. The halide containing stream can be wet, or dry. In general, water vapor present in the halide stream tends to lower the halide loading slightly below that compared to a dry halide application by approximately about 0.4 weight percent, but generally results in a more uniform halide distribution. Thus, saturation by dry hydrogen chloride of a coke-free, dry catalyst will result in up to about a 2.8 weight percent halide loading, whereas saturation with a wet stream of hydrogen chloride will result in up to about 2.4 weight percent, or even slightly lower, halide loading. The period of time required for the halide pretreatment will depend on such factors as flow rate, hydrogen halide gaseous concentrations, and amount of catalyst. Such period can be adjusted, for example, to run for about 1 to 3 hours per catalyst regeneration in general. Concentration of hydrogen halide generally ranges from 0.05 to about 5 volume percent, or higher, in the treat gas stream, which can be at a total pressure of about 0.1 to 2.0 MPa. Higher and lower values of both variables can also be used effectively.

Following the halide pretreatment step, the catalyst is then subjected to a hydrogen halide/oxygen metals redispersion step by contacting the catalyst with a mixture of hydrogen halide and oxygen. Prior to beginning the metals redispersion step however, the reactor is again by passed; the flow of gases from the regenerator circuit passing around the reactor for recycle to the regenerator circuit. The reactor is again by passed during the period of heavy flow of iron scale from the regenerator circuit, and when the flow of iron scale subsides the by pass line is again closed and the reactor again connected with the regenerator circuit. Generally, the reactor is by passed for a period ranging between about 4 hours and 8 hours, most often from about 4 hours to about 6 hours. Thereafter, the reactor is again opened to the flow of gases from the regenerator circuit.

The metals redispersion step is generally carried out at a temperature ranging from about 450° C. to about 600° C., preferably from about 500° C. to about 575° C. Exemplary of hydrogen halides employed in the metals redispersion step are hydrogen fluoride, hydrogen chloride, hydrogen bromide and the like, with hydrogen chloride being preferred. In the metals redispersion step the ratio of oxygen/hydrogen halide is generally maintained in a volume ratio of from about 1:5 to about 100:1, preferably from about 2:1 to about 60:1, and most preferably from about 4:1 to about 20:1. The elemental oxygen also acts to remove residual carbon deposits left from the decoking step. The gaseous hydrogen halide/oxygen atmosphere may contain inert gases such as nitrogen, carbon dioxide present from the coke combustion step, and also water vapor. Preferably, the gas is dry, but if present, the water should be present in an amount not in excess of about 2 volume percent, preferably 0.05 volume perent.

The hydrogen halide concentration ranges from about 0.05 to 5 volume percent, or higher, which can be at a total pressure of about 0.1 to 2.0 MPa. The concentration and pressure are not critical, and hence higher and lower values of both variables can also be used effectively. The redispersion is generally conducted beyond oxygen breakthrough occurs, as evidenced or detected, for example, by an oxygen analyzer. Generally, this requires about 0.5 to 2 hours of treatment for used catalyst, dependent upon flow rate, amount of catalyst, and the concentrations of hydrogen halide and oxygen employed in the treat gas. Often, however, slightly longer times of treatment are required for substantially complete redispersion, which is readily determined by the absence of crystalline metal or metal oxide lines in the X-ray diffraction patterns. Preferably, a time period substantially past breakthrough, is necessary for substantially complete redispersion, generally from about 30 to 90 minutes past breakthrough. Operation past breakthrough of the hydrogen halide/oxygen feedstream is preferred to avoid redispersion gradients along the catalyst bed of redispersed iridium metal. Where gradients are present, usually percent redispersion regions of iridium metal are high at the exit side of the reactor, decreasing towards the entry side of the reactor.

Substantially complete redispersion of the metal, or metals component of iridium-containing catalyts can be achieved, particularly platinum-iridium on alumina catalysts as are widely used in hydrocarbon reforming operations. In the latter case, 75 to 100 percent redispersion of both the platinum and iridium agglomerated metals are readily achieved. By by passing the reactor from the flow of gas from the regenerator circuit during oxidation-reduction and reduction-oxidation transitions the flow of iron scale from the regenerator circuit to the reactor can be greatly lowered, as can catalyst deactivation caused by reaction between the catalyst and the iron scale. In conducting the catalyst reactivation sequence, one cycle of hydrogen reduction and halogenation treatments is often adequate. However, in certain cases such as where minimum treatment past oxygen breakthrough is desired, multi-cycle treatment may prove necessary with concomitant need for additional pretreatment steps.

Prior to return of the catalyst to on oil conditions, excessive halide is removed from the catalyst by stripping the catalyst by contact thereof with steam at temperatures ranging from about 400° C. to about 540° C., preferably from about 470° C. to about 490° C. The stripped catalyst will generally contain from about 0.9 percent to about 1.3 percent halogen, based on the weight of the catalyst (dry basis).

The following examples are exemplary of the more salient features of the invention.

EXAMPLES

Two separate reactors (Reactor 1 and Reactor 2) contained coked platinum iridium (0.3 wt. % Pt/0.3 wt. % Ir) catalyst. The coke was burned from both using a primary burn at 425° C. by contact with a gaseous mixture of nitrogen, $O_2$ at 1.4 KPa partial pressure and HCl at 15 Pa partial pressure. The coke depleted catalyst, in each instance, was then dumped and screened to separate the catalyst from extraneous solids. Each catalyst charge was returned separately to its original reactor for conducting two separate catalyst reactivation runs.

Run 1 (Reactor 1):

In a first run, prior to initiation of a reduction step, the reactor was by passed for a period of 8 hours from the time the reduction reaction was initiated. Thereafter the coke depleted catalyst was contacted at 510° C. over a period of 4 hours with a stream of 1.51% $H_2$.

A halogenation step was conducted on completion of the reduction step. After reduction, the reduced catalyst was thus contacted and treated over a 4 hour period with a stream of gas containing 1.5% $H_2$ and 500 vol. ppm of HCl. At the end of this period the reactor was by passed, and a metals redispersion step was initiated. The reactor was by passed for a period of 8 hours from the time the redispersion step was initiated.

The metals redispersion step was next conducted by opening the reactor to the flow of gas from the regenerator circuit and closing the reactor by pass. The catalyst was contacted at 510° C. over a 10 hour period with a gas containing from 0.3 to 2.5% $O_2$ and 500 vol. ppm of HCl.

The catalyst was then stripped by contact of the catalyst at 510° C. for a period of 12 hours duration with a gas constituted of 1.5% $H_2$, 24 vol. ppm HCl and 1000 vol. ppm of $H_2O$. A reduction step was then initiated, and on initiation of the reduction step the reactor was again by passed; gas from the regenerator circuit flowing around but not through the reactor. Subsequently, the catalyst was reduced by contact of the catalyst at 400° C. for a 4 hour period with a gas containing 1.5% $H_2$.

The catalyst was found to contain 0.1 wt. % Fe.

Run 2 (Reactor 2):

On repeating Run 1 with the second catalyst, carrying out the same sequence of steps at similar conditions, except that the reactor was not by passed at any time, a catalyst was obtained which contained between 0.8 and 1.2 wt. % Fe.

Identical charges of the two catalysts obtained from these runs were charged to a reactor and operated by contact with a naphtha feed at on-oil conditions for comparative purposes. Both catalysts were employed in two separate on-oil runs to process a feed described as follows:

| Feed | |
|---|---|
| Specific Gravity, 15° C. | 0.7480 |
| ASTM D-86, °C. | |
| IBP | 50 |
| 5 | 95 |
| 10 | 100 |
| 50 | 118 |
| 90 | 143 |
| 95 | 153 |
| FBP | 163 |
| RON. Cl | 56.4 |
| KW | 11.85 |
| Aniline Point, °C. | 49.4 |
| Refractive Index, $n_D^{20}$ | 1.4205 |
| Bromine No., g/100 ml | 0.16 |
| Water, wppm | 42 |
| Chloride, wppm | <2 |

Both on-oil runs were conducted at the following conditions of operations, to wit:

| Recycle Gas | |
|---|---|
| SCF/B | 4000 |
| Pressure, KPa gauge | 2240 |
| $H_2$ Partial Pressure, KPa (abs) | 1100–1170 |
| H/O Ratio | 2.7 |
| W/W/Hr | 2 |
| RON, Cl | 99 |

-continued

| | |
|---|---|
| Recycle Gas | |
| Sulphur, wppm Once-Through Equivalent | <0.05 |

The catalyst reactivated in accordance with the procedure of Run 1, which contained only 0.1% Fe, was found to have an activity considerably higher than that produced by the procedure of Run 2. On a cpmarative basis, the activity of the higher iron content catalyst is below 100 whereas the activity of the catalyst produced by the procedure of Run 1 is greater than 150. These data thus show that the by pass of the reactor during reduction-oxidation or oxidation-reduction transitions avoid carryover of large amounts of iron scale from the regenerator circuit to the reactor, with the result that catalyst activity is much improved.

Having described the invention what is claimed is:

1. In a reforming process for regenerating and reactivating within a reactor a bed of catalyst comprised of an iridium component dispersed upon an inorganic oxide support catalytically deactivated during the on-oil portion of a reforming cycle of operation by coke deposition thereon, the reactor being contained in a multi-reactor unit, the individual reactors of which are connected in series via suitable piping and valving such that said reactor can be alternately manifolded with production facilities during the on-oil portion of the operating cycle during which period the catalyst of said reactor becomes coked, and with a ferrous metal regeneration circuit during the catalyst regeneration and reactivation portion of an operating cycle during which period the catalyst is regenerated and reactivated, the steps required for regeneration and reactivation of the coked catalyst of said reactor including (a) an oxidation step and subsequent reduction step, or (b) a reduction step and subsequent oxidation step, to remove coke and redisperse the iridium component of the catalyst of said reactor, each step of which is conducted by manifolding the ferrous metal regeneration circuit with said reactor such that iron scale from the regeneration circuit can be carried over to the catalyst of said reactor during the regeneration and reactivation of the catalyst, the improvement comprising by-passing said reactor during the periods of transition from the (a) oxidation step to the reduction step, or (b) from the reduction step to the oxidation step by closing off the manifold connection between the regeneration circuit and said reactor during said periods of transition to avoid iron scale carryover from the regenerator circuit to said reactor during such transition periods, whereby the amount of iron scale transferred to the catalyst of said reactor during the overall regeneration and reactivation period of the operating cycle is reduced and the consequent loss of catalyst activity due to iron scale carryover to the catalyst of said reactor is suppressed vis-a-vis a process otherwise similar except that the reactor in which the catalyst is being regenerated and reactivated during the periods of transition from the (a) oxidation step to the reduction step, or (b) from the reduction step to the oxidation step is not by-passed.

2. The process of claim 1 wherein the regeneration circuit and the by passed reactor are maintained in a by pass condition, during said transition periods, for a period ranging up to about 8 hours.

3. The process of claim 2 wherein the regeneration circuit and the by passed reactor are maintained in a by pass condition, during said transition periods, for a period ranging up to 6 hours.

4. The process of claim 2 wherein the by pass condition is maintained for a period ranging from about 4 hours to about 8 hours.

5. In a reforming process for regenerating and reactivating within a reactor a bed of catalyst comprised of an iridium component dispersed upon an inorganic oxide support catalytically deactivated during the on-oil portion of a reforming cycle of operation by coke deposition thereon, the reactor being contained in a multi-reactor unit, the individual reactors of which are connected in series via suitable piping and valving such that said reactor can be alternately manifolded with production facilities during the on-oil portion of the operating cycle during which period the catalyst of said reactor becomes coked, and with a ferrous metal regeneration circuit during the catalyst regeneration and reactivation portion of an operating cycle during which period the catalyst is regenerated and reactivated, the steps required for regeneration and reactivation of the coked catalyst of said reactor including a primary burn wherein the coke is burned from the catalyst by contact thereof with a gas of low oxygen content at temperature below about 425° C., and thereafter the decoked catalyst is subjected to one or more cycles of sequential hydrogen reduction and halogenation treatments to reactivate the catalyst, as follows:

(i) contacting said agglomerated catalyst within a hydrogen atmosphere at a temperature ranging from about 250° C. to about 600° C. and at a pressure ranging from about 0.1 to about 2.0 MPa sufficient to substantially reduce the iridium component of said catalyst, the improvment comprising on initiating step (i), by passing said reactor to the flow of gases from the regeneration circuit for a period ranging up to about 8 hours by closing off the manifold connection between the regeneration circuit and said reactor to avoid iron scale carryover from the regenerator circuit to said reactor whereby the amount of iron scale transferred to the catalyst of said reactor during the overall regeneration and reactivation period of the operating cycle is reduced and the consequent loss of catalyst activity due to iron scale carryover to the catalyst of said reactor is suppressed vis-a-vis a process otherwise similar except that on intitiating step (i) the reactor is not by passed.

6. The process of claim 5 wherein the regeneration circuit and the by passed reactor are maintained in a by passed condition for a period ranging up to about 6 hours.

7. The process of claim 6 wherein the condition is maintained for a period ranging from about 4 to 6 hours.

8. The process of claim 5 wherein the process further includes the steps of (ii) pretreating the catalyst from step (i) by contact with an elemental oxygen-free atmosphere comprising hydrogen halide at a temperature ranging from about 250° C. to about 600° C. and at a pressure ranging from about 0.1 to about 2.0 MPa to add halogen to the catalyst, and (iii) redispersing the metallic iridium from step (ii) by contact with an atmosphere comprising hydrogen halide and elemental oxygen in an oxygen/hydrogen halide volume ratio of from about 4:1 to about 20:1, at a temeprature in the range of from about 450° C. to about 600° C. for a time sufficient to effect substantial redispersion of the iridium component of said catalyst, and on initiating step (iii), the reactor is again by passed to the flow of gases from the regenerator circuit for a period ranging up to about 8 hours by closing the manifold connection between the regeneration circuit and said reactor to avoid iron scale carryover from the regenerator circuit to said reactor.

9. The process of claim 8 wherein after initiating step (iii), the by pass condition is maintained for a period ranging up to about 6 hours.

10. The process of claim 9 wherein the condition is maintained for a period ranging from about 4 hours to about 6 hours.

11. In a reforming process for regenerating and reactivating within a reactor a bed of catalyst comprised of an iridium component dispersed upon an inorganic oxide support catalytically deactivated during the on-oil portion of a reforming cycle of operation by coke deposition thereon, the reactor being contained in a multi-reactor unit, the individual reactors of which are connected in series via suitable piping and valving such that said reactor can be alternately manifolded with production facilities during the on-oil portion of the operating cycle during which period the catalyst of said reactor becomes coked, and with a ferrous metal regeneration circuit during the catalyst regeneration and reactivation portion of an operating cycle during which period the catalyst is regenerated and reactivated, the steps required for regeneration and reactivation of the coked catalyst of said reactor including a primary burn wherein the coke is burned from the catalyst by contact thereof with a gas of low oxygen content at temperature below about 425° C., and thereafter the decoked catalyst is subjected to on or more cycles of sequential hydrogen reduction and halogenation treatments to reactivate the catalyst, as follows:

(i) contacting said agglomerated catalyst with a hydrogen atmosphere at a temperature in the range of from about 300° C. to about 540° C. and at a pressure of from about 0.1 to about 2.0 MPa sufficient to substantially reduce the iridium component of said catalyst, (ii) pretreating the catalyst from step (i) by contact with an elemental oxygen-free atmosphere comprising hydrogen chloride at a temperature in the range of from about 300° C. to about 540° C. and at a pressure of from about 0.1 to about 2.0 MPa to add chloride to the catalyst, and (iii) redispersing the metallic iridium from step (ii) by contact with an atmosphere comprising hydrogen chloride and elemental oxygen in an oxygen/hydrogen chloride volume ratio of from about 4:1 to about 20:1, at a temperature in the range of from about 500° C. to about 575° C. for a time sufficient to effect from about a 75 percent to about 100 percent redispersion of the iridium, the improvement comprising on initiating steps (i) and (iii), by passing said reactor to the flow of gases from the regeneration circuit for a period ranging up to about 8 hours by closing the manifold connection between the regeneration circuit and said reactor to avoid iron scale carryover from the regeneration circuit to said reactor whereby the amount of iron scale transferred to the catalyst of said reactor during the overall regeneration and reactivation periods of the operating cycle is reduced and the consequent loss of catalyst activity due to iron scale carryover to the catalyst of said reactor suppressed vis-a-vis a process otherwise similar except that on initiating steps (i) and (iii) the reactor is not by passed.

* * * * *